US010373270B2

(12) United States Patent
Guo et al.

(10) Patent No.: US 10,373,270 B2
(45) Date of Patent: Aug. 6, 2019

(54) IDENTIFYING POSTS IN A SOCIAL NETWORKING SYSTEM FOR PRESENTATION TO ONE OR MORE USER DEMOGRAPHIC GROUPS

(71) Applicant: Facebook, Inc., Menlo Park, CA (US)

(72) Inventors: Dong Guo, Milpitas, CA (US); Mark Kar Hong Wong, Redwood City, CA (US); Abheek Anand, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 536 days.

(21) Appl. No.: 14/053,567

(22) Filed: Oct. 14, 2013

(65) Prior Publication Data
US 2015/0106192 A1 Apr. 16, 2015

(51) Int. Cl.
*G06Q 30/02* (2012.01)
*G06Q 50/00* (2012.01)
G06Q 30/00 (2012.01)

(52) U.S. Cl.
CPC ......... *G06Q 50/01* (2013.01); *G06Q 30/0246* (2013.01); *G06Q 30/0269* (2013.01)

(58) Field of Classification Search
CPC .......... G06Q 30/0246; G06Q 30/0244; G06Q 30/0242; G06Q 30/0269
USPC ....................................................... 705/14.49
See application file for complete search history.

(56) References Cited

U.S. PATENT DOCUMENTS

| | | | | |
|---|---|---|---|---|
| 7,486,926 | B2 * | 2/2009 | White | G06Q 30/0267 455/3.05 |
| 9,064,270 | B2 * | 6/2015 | Rathburn | G06Q 10/0637 |
| 9,094,802 | B2 * | 7/2015 | White | H04W 4/06 |
| 2002/0026351 | A1 * | 2/2002 | Coleman | G06Q 30/02 705/14.19 |
| 2002/0116257 | A1 * | 8/2002 | Helbig | G06Q 30/02 705/14.13 |
| 2002/0161779 | A1 * | 10/2002 | Brierley | G06Q 30/02 |
| 2002/0174011 | A1 * | 11/2002 | Sanchez | G06Q 20/387 705/14.25 |
| 2002/0184088 | A1 * | 12/2002 | Rosenberg | G06Q 30/00 705/14.51 |

(Continued)

OTHER PUBLICATIONS

Monetization and Services on a Real Online Social Network Using Social Network Analysis Dec. 2013, Blaise Ngonmang et al., 2013 IEEE 13th International Conference on Data Mining Workshops (pp. 185-193).*

*Primary Examiner* — Luis A Brown
*Assistant Examiner* — Robert C Johnson
(74) *Attorney, Agent, or Firm* — Fenwick & West LLP

(57) ABSTRACT

To promote an object maintained by a social networking system, an advertiser identifies the object to the social networking system. Based on the user interaction with one or more posts associated with the object, the social networking system selects one or more candidate posts from the one or more posts. Promotion efficacies of each candidate post for a group of users having one or more common demographic characteristics are determined and a candidate post is selected based at least in part on the promotion efficacies. The selected candidate post may be identified to the advertiser or presented to additional users having the common demographic characteristic by the social networking system.

25 Claims, 7 Drawing Sheets

(56) References Cited

U.S. PATENT DOCUMENTS

| | | | |
|---|---|---|---|
| 2003/0135853 A1* | 7/2003 | Goldman | G06Q 30/02 725/34 |
| 2003/0182184 A1* | 9/2003 | Strasnick | G06Q 30/02 705/14.66 |
| 2003/0212596 A1* | 11/2003 | DiPaolo | G06Q 30/02 705/14.66 |
| 2004/0103017 A1* | 5/2004 | Reed | G06Q 10/0637 705/7.31 |
| 2005/0086105 A1* | 4/2005 | McFadden | G06Q 30/02 705/14.43 |
| 2005/0171839 A1* | 8/2005 | Corriere | G06Q 30/02 705/14.14 |
| 2007/0050204 A1* | 3/2007 | Ranka | G06Q 10/06315 705/14.41 |
| 2007/0112624 A1* | 5/2007 | Jung | G06Q 30/02 705/14.36 |
| 2008/0046317 A1* | 2/2008 | Christianson | G06Q 30/02 705/14.44 |
| 2008/0065479 A1* | 3/2008 | Tomlin | G06Q 10/04 705/14.43 |
| 2008/0103906 A1* | 5/2008 | Singh | G06Q 30/0253 705/14.64 |
| 2008/0133321 A1* | 6/2008 | Pennock | G06Q 30/02 705/14.54 |
| 2008/0133323 A1* | 6/2008 | Willms | G06Q 10/06316 705/14.45 |
| 2008/0201206 A1* | 8/2008 | Pokorney | G06Q 30/02 705/7.29 |
| 2008/0281627 A1* | 11/2008 | Chang | G06Q 10/06375 705/7.39 |
| 2009/0063377 A1* | 3/2009 | Brady | G06Q 30/02 706/20 |
| 2010/0114662 A1* | 5/2010 | Jung | G06Q 10/10 705/35 |
| 2010/0114705 A1* | 5/2010 | Hoyle | G06F 8/60 705/14.54 |
| 2010/0179867 A1* | 7/2010 | Hughes | G06Q 10/02 705/14.5 |
| 2010/0228617 A1* | 9/2010 | Ransom | G06Q 30/02 705/14.25 |
| 2010/0235242 A1* | 9/2010 | Firminger | G06Q 30/02 705/14.66 |
| 2011/0022474 A1* | 1/2011 | Jain | G06Q 30/02 705/14.66 |
| 2011/0258039 A1* | 10/2011 | Patwa | G06Q 30/00 705/14.45 |
| 2012/0158501 A1* | 6/2012 | Zhang | G06Q 30/0255 705/14.53 |
| 2012/0209795 A1* | 8/2012 | Glickman | G06Q 30/0201 706/12 |
| 2013/0024879 A1* | 1/2013 | Bruich | H04H 60/33 725/9 |
| 2014/0257979 A1* | 9/2014 | Luke | G06Q 30/0242 705/14.53 |
| 2016/0321704 A1* | 11/2016 | Elgebeely | G06Q 30/0267 |
| 2017/0206557 A1* | 7/2017 | Abrol | G06Q 30/0261 |

* cited by examiner

800

Receive from an advertiser an indication of an object to be promoted
810

Access user profile associated with the advertiser
815

Authorized to promote?
820 —N→ Present object without promote option
825

Y

Present posts associated with the object to social networking system users
827

Observe user interaction with each presented post
830

IDENTIFYING POSTS IN A SOCIAL NETWORKING SYSTEM FOR PRESENTATION TO ONE OR MORE USER DEMOGRAPHIC GROUPS

BACKGROUND

This disclosure relates generally to social networking systems, and more specifically to advertising via a social networking system.

Social networks, or social utilities that track and enable connections between users (including people, businesses, and other entities), have become prevalent in recent years and allow users to communicate information more efficiently. For example, a social networking system user may post contact information, background information, job information, hobbies, and/or other user-specific data to the social networking system. Other users can then review the posted data by browsing user profiles or searching for profiles including specific data. Social networking systems also allow users to associate themselves with other users, thus creating a web of connections among the users of the social networking system. These connections among the users can be leveraged by the social networking system to offer more relevant information to each user in view of user-stated interests.

Additionally, social networking systems enable users to interact with other users or objects by performing various actions. For example, users may post comments to pages associated with other users, view images, view video, listen to audio data or perform other actions on various objects maintained by the social networking system. Actions performed by a user are frequently distributed to other users connected to the user who performed the action. Often, social networking systems generate newsfeeds for their users, where various stories in the newsfeed describe actions performed by other users connected to the user viewing the newsfeed. A social networking system may prioritize stories in the newsfeed so that stories likely to be of interest to the viewing user are more readily accessible to the viewing user. For example, stories describing actions performed by users with whom the viewing user frequently interacts or describing actions performed on objects in which the user has a particular interest may be easier to view via the newsfeed.

Users, such as advertisers, may advertise products or events or otherwise communicate content to other users via a social networking system. For example, content may be described by stories indicating other users' interactions with the social networking system. These stories may be included in newsfeeds presented to social networking system users connected to users performing the interactions. As a user may have different levels of interactions with different social networking system users, the social networking system may determine that some users are not likely to be interested in a story describing a user's interaction, which reduces the effectiveness of the social networking system in communicating content. Hence, users may seek to increase the likelihood of a particular story being presented to other social networking system users, allowing more effective communication of content.

SUMMARY

Users of a social networking system have varying levels of propensity for interacting with various content items provided by the social networking system. Examples of content items provided by the social networking system with which a user may interact include a page post, a status update, a photograph, a video, a link, a shared content item, a gaming application achievement, a check-in event at a local business, a brand page, or any other type of content. In various embodiments, the social networking system maintains objects representing each content item.

Different social networking system users have different likelihoods for interacting with different objects or with content items associated with objects. Various criteria may affect a user's likelihood of interacting with an object. Examples of factors affecting a user's likelihood of interacting with an object include characteristics of an object, demographic information associated with the user, and interests of the user maintained by the social networking system. Additionally, various social networking system users associated with similar demographic information and/or interests may have similar likelihoods of interacting with objects having similar characteristics.

To increase user interaction with pages, or other content items on pages, associated with objects, the social networking system identifies posts having at least a threshold amount of prior user interaction with the posts from a page. Page posts having at least the threshold amount of user interaction are identified as candidate posts. Additionally, demographic information associated with users that interacted with one or more candidate posts is determined and used to generate one or more user demographic groups that each include users having one or more common demographic characteristics. One or more posts associated with the object are presented to social networking system users and interaction between the social networking system users and each of the one or more posts is determined. Based on the user interaction, the social networking system selects one or more candidate posts from the presented one or more posts. A promotion efficacy of each candidate post for a user demographic group is measured based at least in part on interaction with a candidate post by users within the user demographic group. The promotion efficacy of a candidate post for a user demographic group may provide a measure of an amount of user interaction between users within the user demographic group and an object associated with the candidate post after the users are presented with the candidate post.

Based at least in part of the promotion efficacies of various candidate posts for the user demographic group, a candidate post is selected for presentation to users within the user demographic group. For example, a candidate post having a highest promotion efficacy is selected for presentation to users within the user demographic group. The selected candidate post may be identified to an advertiser, allowing the advertiser to configure presentation of the selected candidate post to users within the user demographic group. Additionally, information describing the common demographic characteristics of users in the user demographic group may be identified to the advertiser. Alternatively, the selected candidate post may be presented to additional users in the user demographic group by the social networking system. For example, the selected candidate post is presented to users in the user demographic group that were not previously presented with the selected candidate post. In some embodiments, information provided by an advertiser, such as a goal for user interaction with a post or a budget for presenting content to users affects presentation of the selected candidate post to additional users in a user demographic group.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
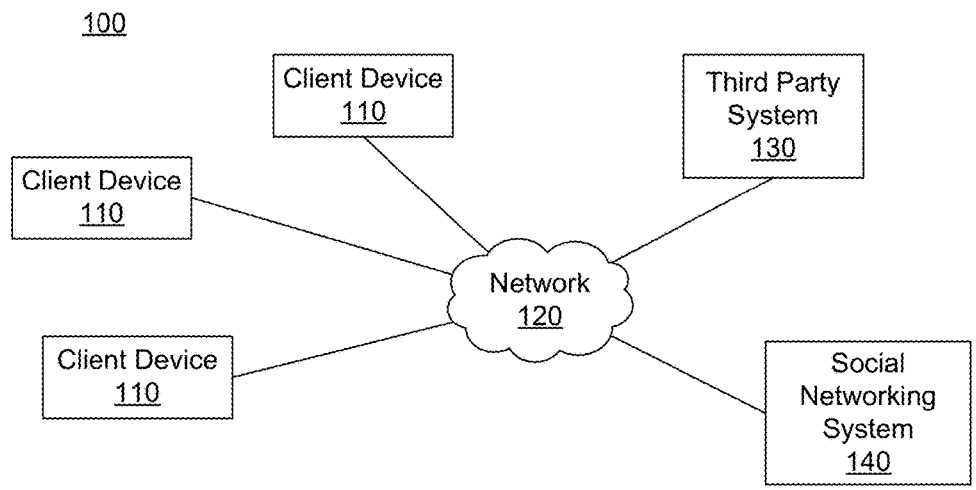
FIG. 1 is a block diagram of a system environment in which a social networking system operates, in accordance with some embodiments.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 1. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
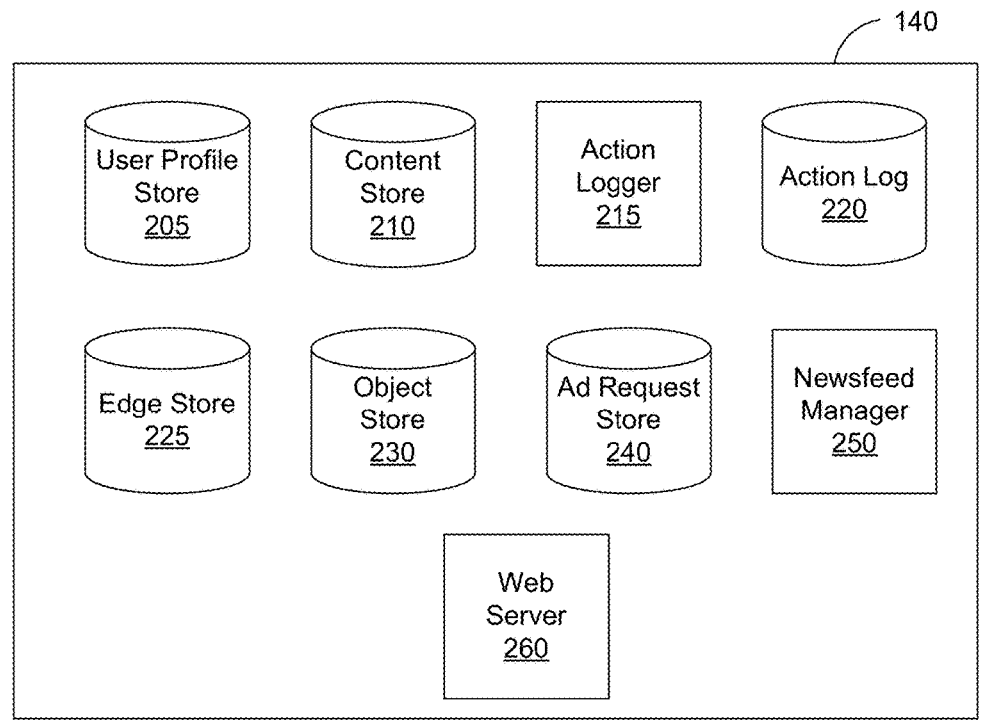
FIG. 2 is a block diagram of a social networking system, in accordance with some embodiments.

FIG. 2 is an example block diagram of an architecture of the social networking system 140. The social networking system 140 shown in FIG. 2 includes a user profile store 205, a content store 210, an action logger 215, an action log 220, an edge store 225, an object store 230, ad request store 240, newsfeed manager 250, and a web server 280. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 230 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the advertisement request store 240. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users. In some embodiments, the advertisement request store 240 obtains or derives targeting criteria directly from content items associated with users, such as posts, stored in the content store 210 and associates the derived targeting criteria with one or more advertisement requests.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 250 may generate stories for presentation to a user based on information in the action log 220 and in edge store 225 or may select candidate stories included in content store 210. One or more of the candidate stories are selected and presented to a user by the newsfeed manager 250.

For example, the newsfeed manager 250 receives a request to present one or more stories to a social networking system user. The newsfeed manager 250 accesses one or more of the user profile store 205, the content store 210, the action log 220, and the edge store 230 to retrieve information about the identified user. For example, stories or other data associated with users connected to the identified user are retrieved. The retrieved stories or other data are analyzed by the newsfeed manager 250 to identify content likely to be relevant to the identified user. For example, stories associated with users not connected to the identified user or stories associated with users for which the identified user has less than a threshold affinity are discarded as candidate stories. Based on various criteria, the newsfeed manager 250 selects one or more of the candidate stories for presentation to the identified user. Additionally, the newsfeed manager 250 may select candidate stories based in part on compensation received by the social networking system 140 for presenting a candidate story to one or more users. This allows an advertiser or other entity to sponsor a story for presentation to social networking system users. Examples of stories sponsored by advertisers or entities ("sponsored stories") are described in U.S. application Ser. No. 12/193,702, filed Aug. 18, 2008, published as U.S. Patent Application Publication No. 2009/0119167, which is incorporated in its entirety by reference herein.

In various embodiments, the newsfeed manager 250 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 250 may also determine the order in which selected stories are presented via the newsfeed. For example, the newsfeed manager 250 determines that a user has a highest affinity for a specific user and increases the number of stories in the newsfeed associated with the specific user or modifies the positions in the newsfeed where stories associated with the specific user are presented.

The newsfeed manager 250 may also account for actions by a user indicating a preference for types of stories and selects stories having the same, or similar, types for inclusion in the newsfeed. Additionally, the newsfeed manager 250 may analyze stories received by social networking system 120 from various users to obtain information about user preferences or actions from the analyzed stories. This information may be used to refine subsequent selection of stories for newsfeeds presented to various users.

The web server 260 links the social networking system 140 via the network 120 to the one or more client devices 110, as well as to the one or more third party systems 130. The web server 260 serves web pages, as well as other web-related content, such as JAVA®, FLASH®, XML and so forth. The web server 260 may receive and route messages between the social networking system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS®, or BlackberryOS.

Objects and Posts

Figure 3A:
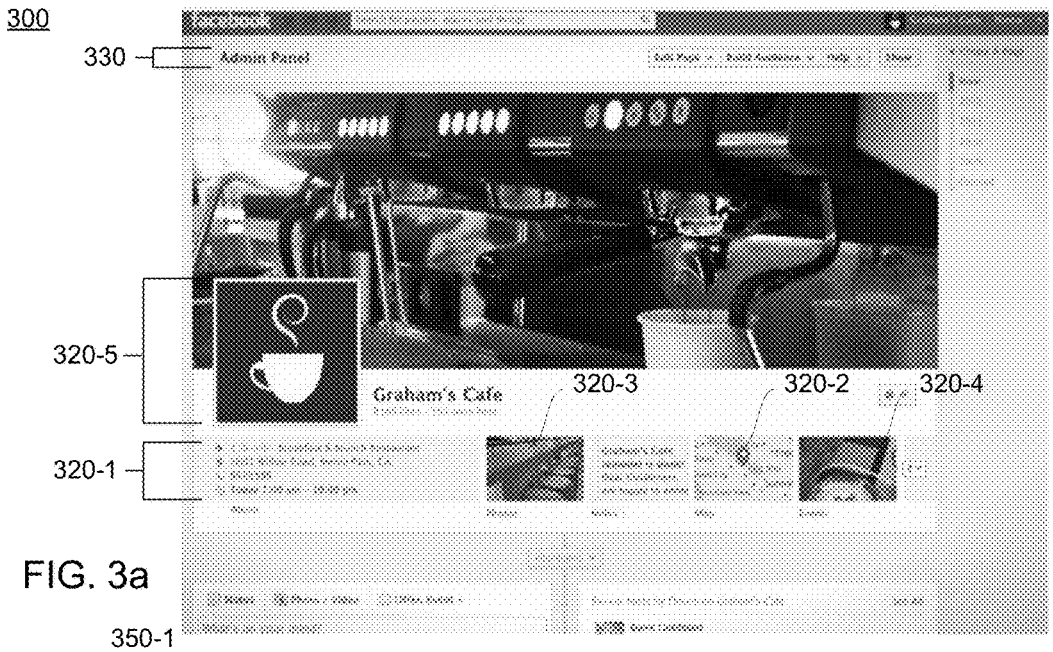
FIG. 3a-3b are examples user interfaces illustrating object pages and posts related to object pages in a social networking system, in accordance with some embodiments.
Figure 3B:
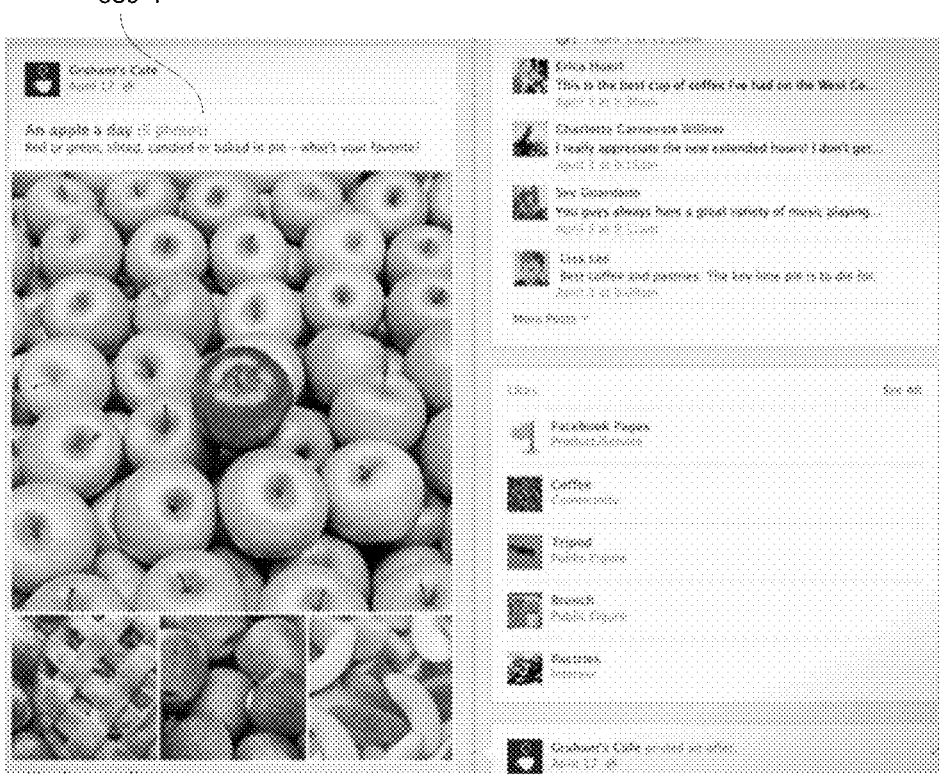

FIGS. 3a-3b show examples of user interfaces illustrating objects in a social networking system. FIG. 3a illustrates an example of an object 300, such as a page, in the social networking system that represents a real-world entity or brand. In the example shown in FIG. 3a, the real-world entity is a commercial business or enterprise (e.g., Graham's Cafe) and the object associated with the entity or the commercial enterprise is a profile page displaying information about the entity. In the example of FIG. 3a, the object 300 displays one or more geographic locations, contact information and business hours 320-1, maps 320-2, graphical content 320-3, event information 320-4, and a logo 320-5; additional information about the entity may also be displayed. In some embodiments, an advertiser associated with the entity (e.g., the owner of the entity or a content developer authorized by the owner of the entity) has administrative rights to modify content presented by the object or access to the object. In the example of FIG. 3a, the example object 300 is shown as accessed by an administrative account 330 associated with a social networking system user having administrative rights to modify content presented by the object 300, remove content presented by the object 300, restrict content presented by the object 300, or perform other modifications of content associated with the object 300.

In some embodiments, such as the embodiment shown in FIG. 3b, one or more posts 350-1, 350-2 are presented in association with the object. For example, one or more posts 350-1, 350-2 are displayed on the object 300 (e.g., displayed on a page). A post 350-1, 350-2 may include advertising information about the entity (e.g., information about social or community events associated with the entity, information about products or services sold by the entity, etc.), educational information about the entity (information about new products or services, new retail locations of the entity, etc.), promotional offers (e.g., discounts, sales, etc.), or other information describing the entity associated with the object.

Posts 350-1, 350-2 displayed or presented in association with the object are created by an authorized user of the social networking system. For example, a user with administrative permission to create content associated with the object 300 creates one of more posts 350-1, 350-2. In alternative embodiments, posts displayed in association with the object are created by social networking system users, other than users with administrative permission, that are connected to the object or that otherwise interact with the object. Various types of content may be included in a post 350-1, 350-2. For example a post 350-1, 350-2 includes text data, graphical data, video data, metadata, links to additional content, audio data, or any other suitable type of data. One or more social networking system users that are connected to the object 300 or that have interacted with the object 300 may also interact with posts 350-1, 350-2 associated with the object 300. Examples of user interactions with a post 350-1, 350-2 include providing a comment associated with a post 350-1, 350-2, expressing a preference for the post 350-1, 350-2 (i.e., "liking" the post 350-1, 350-2, sharing the post 350-1, 350-2 with another social networking system user, or any other suitable interaction.

In some embodiments, a post 350-1, 350-2 associated with the object 300 identifies the object 300 but is presented separately from the object 300. For example, a user that is not connected to the object 300 or that has not interacted with the object 300 may generate a post to another user's profile page that identifies the object 300. This post is not presented in association with the object 300, but identifies the object 300 or content associated with the object 300.

Promoting Posts to Additional Social Networking System Users

Advertisers associated with an entity, such as a brand, often seek to promote the entity to social networking system users. Frequently, advertisers seek to promote an entity to social networking system users that have not previously interacted with the entity but that are likely to have an interest in interacting with objects associated with the entity. The extent to which a social networking system user is likely to interact with an object or a post related to an object may depend on one or more demographic characteristics of the user. Example demographic characteristics of a user affecting a likelihood of the user interacting with an object or a post include: age, gender, location, interests, ethnicity, spoken languages, and other suitable information.

Social networking system users having one or more common demographic characteristics may be more likely to interact with posts or objects that have similar attributes. To increase the statistical likelihood of user interaction with objects or posts associate with the objects, the social networking system identifies posts or objects and presents the identified posts of objects to social networking system users having specific demographic characteristics. For example, the social networking system identifies posts to present to a user having at least a threshold amount of prior user interaction by additional users with at least a threshold number of demographic characteristics similar to the user.

Figure 4A:
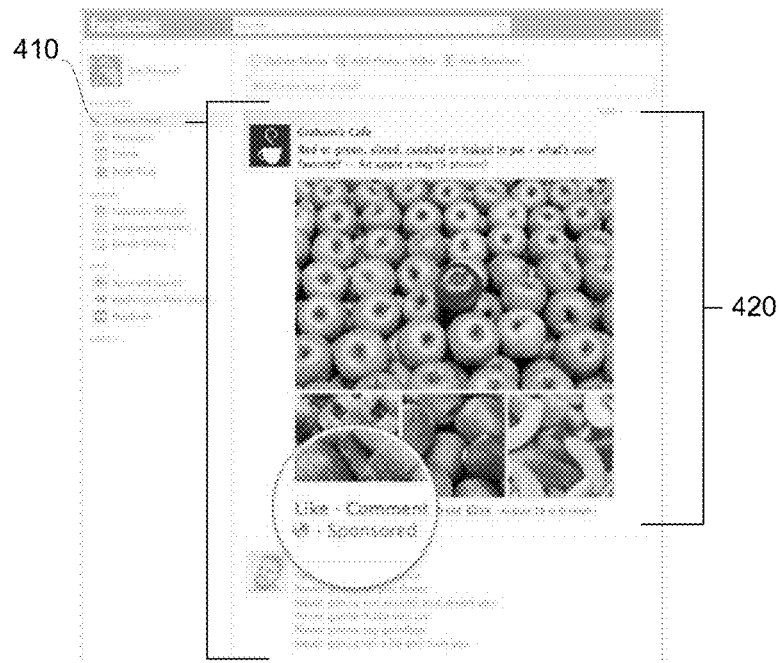
FIGS. 4a-4b are example user interfaces for promoting posts related social networking system objects to social networking system users, in accordance with some embodiments.
Figure 4B:
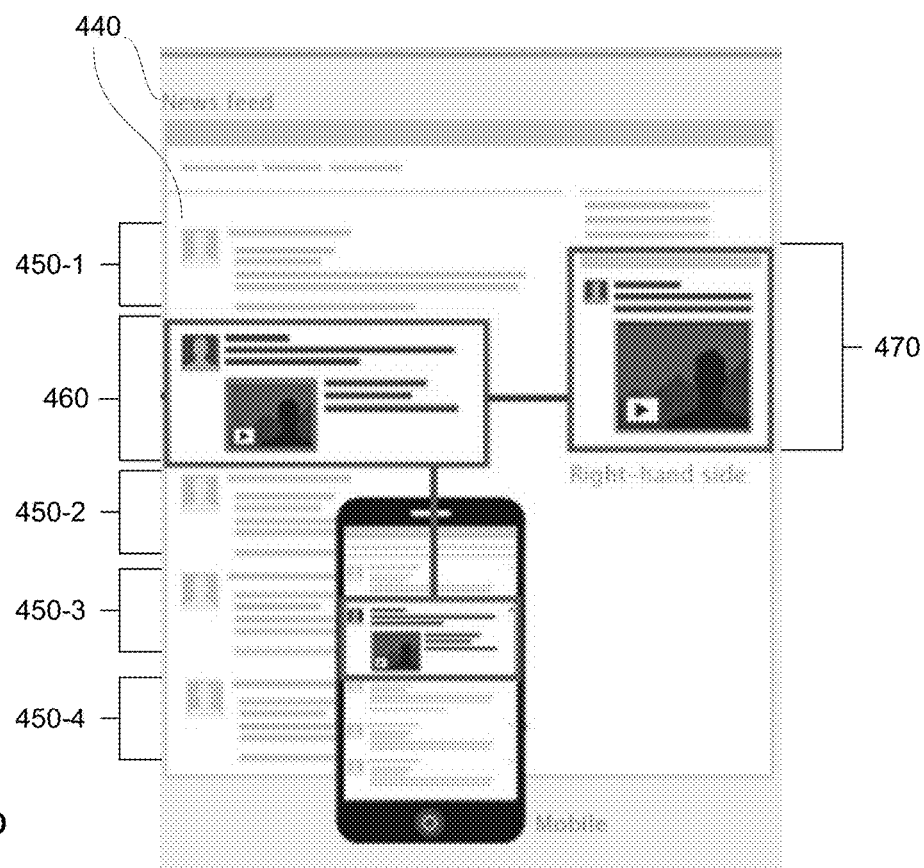

FIGS. 4a and 4b are examples of user interfaces for promoting posts associated with an object to social networking system users. For example, one or more of the user interfaces described by FIGS. 4a and 4b allow a post having at least a threshold amount of user interaction by users with one or more demographic characteristics to be promoted for presentation to additional social networking system users having one or more of the demographic characteristics. A post and demographic characteristics of users that provided the threshold amount of user interaction with the post may be identified to an advertiser or may be used by the social networking system itself to identify additional users to be presented with the post.

In the example shown by FIG. 4a, a post is presented as a story 420 in a newsfeed 410 presented to a social networking system user (a "viewing user"). The story 420 may include content from the post, a description from the post, and one or more options for the viewing user to interact with the post (e.g., comment on the post, express a preference for the post, share the post with another user, etc.). In some embodiment, information describing prior user interaction with the post may also be included in the story 420.

FIG. 4b shows an additional example of a newsfeed 440 presented by the social networking system to the viewing user. The newsfeed 440 includes stories 450-1, 450-2, 450-3 describing actions performed by other social networking system users connected to the viewing user or other organic content. Additionally, as shown in FIG. 4b, the newsfeed 440 may include one or more sponsored stories 460 that include posts promoted by an advertiser or entity. The social networking system receives compensation from an advertiser or entity to include a sponsored story 460 in a newsfeed 440. For example, an advertiser provides monetary compensation to the social networking system for generating and presenting a sponsored story 460 to a social networking system user. The sponsored story 460 may include a post associated with an object maintained by the social networking system selected for presentation to a viewing user based on demographic characteristics of the viewing user, as further described below in conjunction with FIGS. 8a-8b. However, in some embodiments, a post associated with an object maintained by the social networking system is presented to the viewing user in an advertisement 470 displayed separate from the newsfeed 440.

Figure 5:
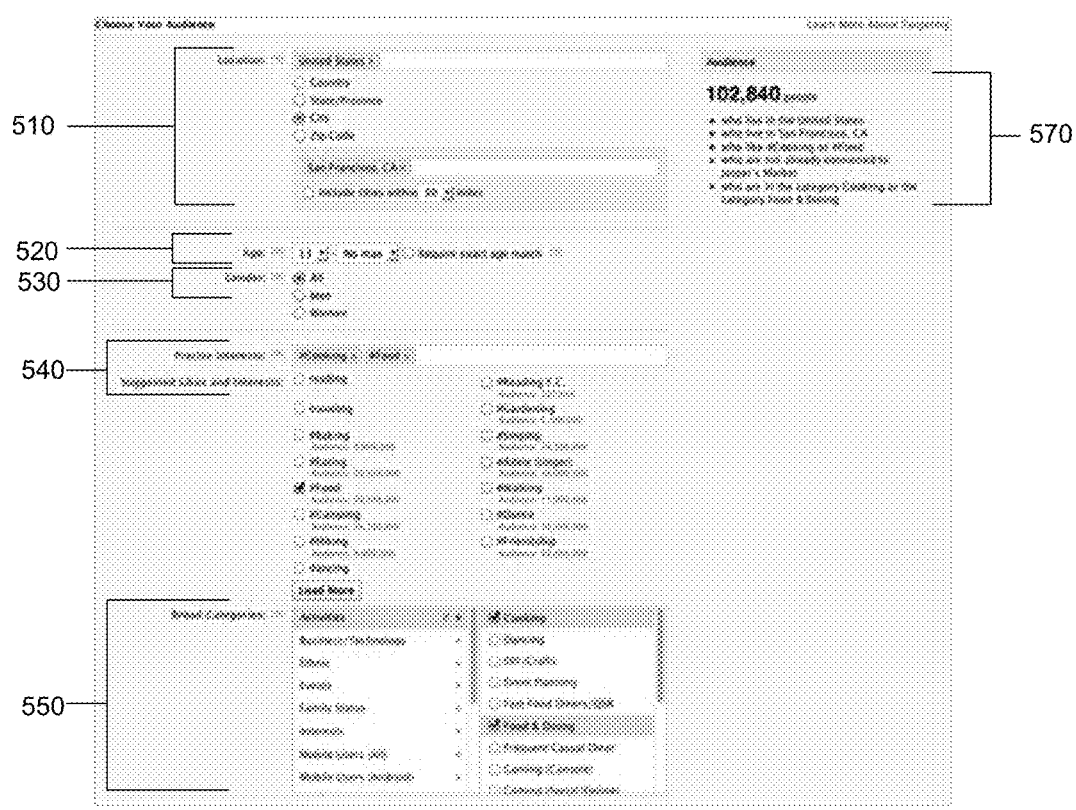
FIG. 5 is an example a user interface for selecting users to receive a post, in accordance with some embodiments.

FIG. 5 includes an example user interface 500 for selecting social networking system users to be presented with a post based on demographic characteristics. In one embodiment, the social networking system observes past user interactions with a plurality of posts and selects posts associated with at least a threshold amount of user interaction as candidate posts to be evaluated for promotion to social networking system users having various demographic characteristics. For example, user demographic groups each associated with one or more demographic characteristics are identified, and the social networking system measures a promotion efficacy of various candidate posts in for various user demographic groups. In some embodiments, promotion efficacy of a candidate post for a user demographic group is measured by promoting the candidate post to users within the user demographic group and determining a number of those target users that interact with the post or with the page associated with the post after being presented with the post. For example, promotion efficacy is measured as a number of users who established a connection with the page associated with the post by interacting with the page (e.g., by liking the page, providing content on the page, sharing or distributing the page, referencing the page for example by using a hyperlink associated with the page, and the like). Alternatively, the promotion efficacy of a post is measured by predicting a statistical likelihood of a user in a user demographic group performing a conversion event if presented with a post. For example, a likelihood of a user performing a conversion event is based on conversion events performed when users in the user demographic group was presented with a post having one or more attributes similar to the post. Examples of conversion events include a user accessing a post, a user expressing a preference for a post, a user sharing a post with another user, and a user commenting on a post.

In the example of FIG. 5, the social networking system determines a candidate post for promotion to a user demographic group. For example, the user demographic group includes users associated with a location of "San Francisco" and an interest in "cooking" or "food." In some embodiments, the social networking system communicates to an advertiser a target audience 570 including users from a user demographic group and a candidate post for presentation to the target audience. The advertiser may modify or directly use the candidate post and/or target audience to present information to social networking system users.

In some embodiments, the social networking system determines user demographic groups by identifying demographic characteristics common to at least a threshold number of users performing at least a threshold amount of interaction with posts. Various user demographic groups may be determined based on combinations of the identified demographic characteristics. Hence, the social networking system determines various user demographic groups based on one or more demographic characteristics of users that previously interacted with posts. For example, user demographic groups are determined based on demographic characteristics associated with users that are connected to an object or that previously performed a threshold amount of interaction with an object. Examples of demographic characteristics determined from users that previously interacted with an object or a post include: one or more age distributions 520, topics of interest 540, a gender distribution 530, one or more locations 510, other categories 550 (e.g., ethnicity, one or more spoken languages, and the like), or any combination thereof.

In some embodiments, the user demographic groups may be selected based on keywords associated with an object with which users interacted and keywords associated with user profiles or other information of users within user demographic groups. For example, the social networking system identifies one or more keywords associated the object to be promoted and identifies user demographic groups including one or more keywords matching a keyword associated with the object. In other embodiments, information other than keywords may be compared between the object and various user demographic groups.

Figure 6:
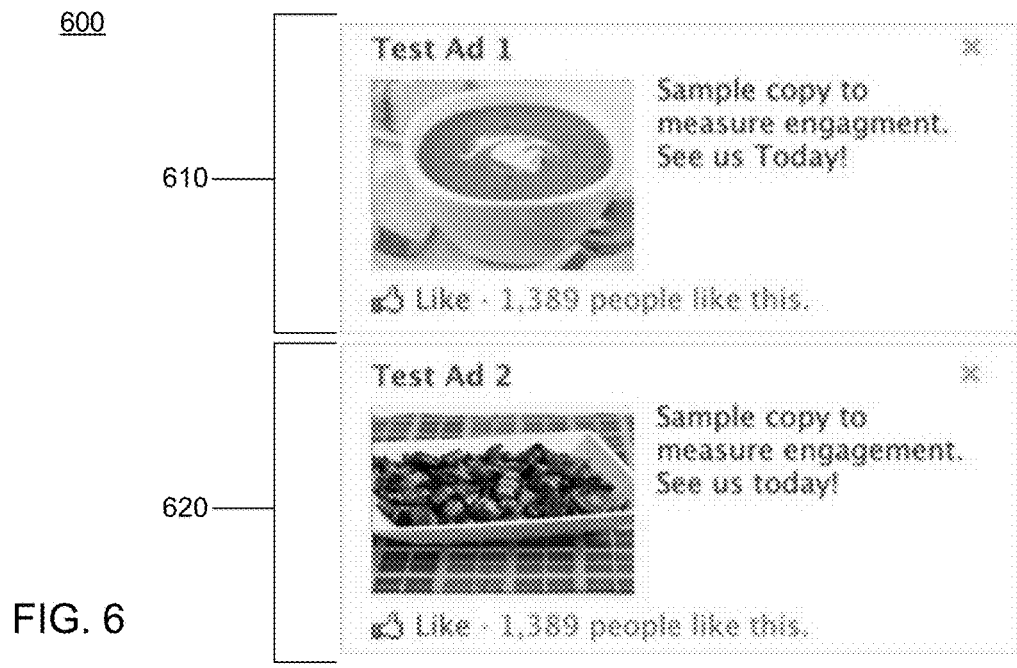
FIG. 6 is an example user interface for promoting one or more posts within an advertising unit, in accordance with some embodiments.

FIG. 6 is an example user interface 600 for promoting one or more posts for presentation within an advertisement. Rather than present a post or object in a story presented in a newsfeed, a post or object may be presented in an advertisement presented to a user in addition to the newsfeed. For example, different candidate advertisements 610, 620 are presented to viewing users from a user demographic group and interaction between the viewing users and each candidate advertisement 610, 620 is observed. A candidate advertisement 610, 620 is selected for presentation to additional users based on an amount of interaction between the viewing users and each candidate advertisement 610, 620. For example, the candidate advertisement 610, 620 associated with the highest amount of interaction is selected for presentation to additional users in the user demographic group.

Figure 7:
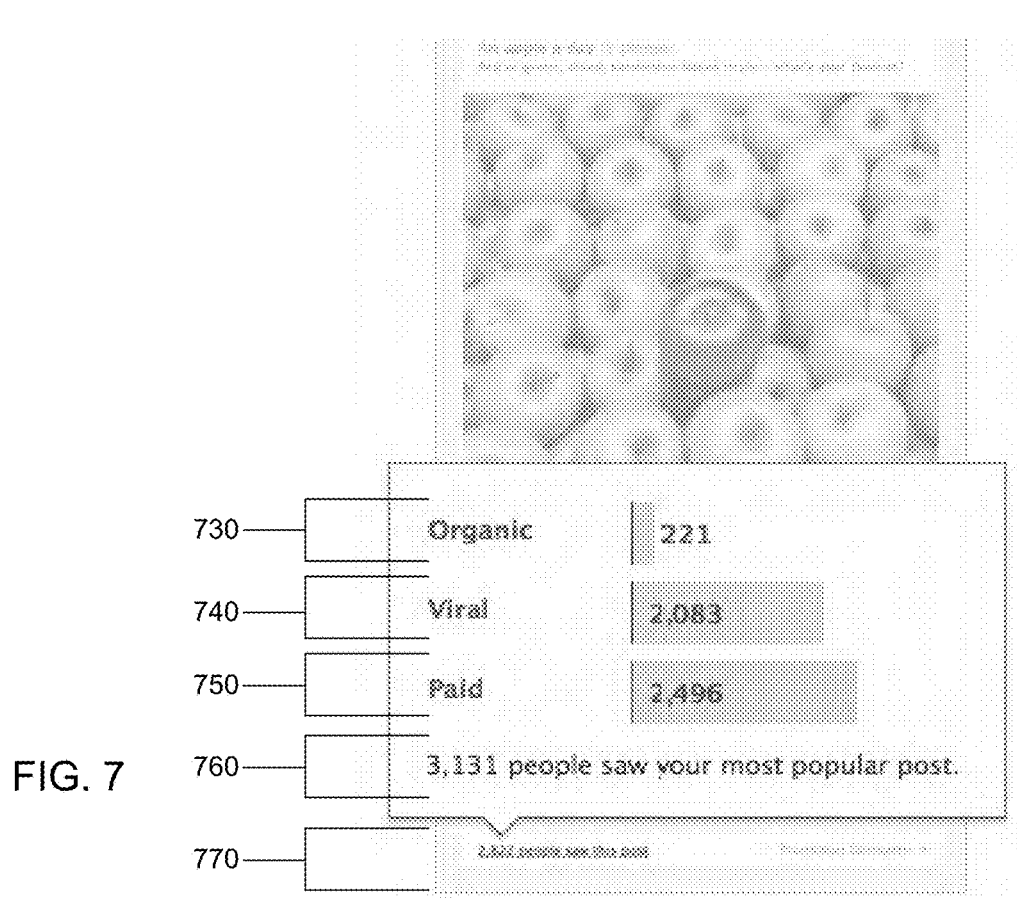
FIG. 7 is an example a user interface for providing an advertiser with information describing one or more promoted posts, in accordance with some embodiments.

FIG. 7 is an example user interface providing information about presentation of a promoted post to social networking system users. The social networking system may provide various information describing the efficacy of the promoted posts to the advertiser, to the entity associated with the object being promoted, or to any other third party entity. In the example of FIG. 7, the social networking system presents a total number of users who viewed a post 770, a number of users to whom the post was presented as organic content 730, a number of users to whom the post was presented as viral content 740 (i.e., a number of users that were presented with the post from one or more other social networking system users, rather than directly from the advertiser or the entity), and a number of users to whom the post was presented as paid content 750 (i.e., a number of users that were presented with the post in exchange for the social networking system receiving compensation from an advertiser or entity). To provide additional information about the efficacy of a post, a total number 760 of users who viewed or interacted with a most popular post associated with an entity associated with the post may also be presented.

In some embodiments, an advertiser specifies a goal for presentation of an object, such as a post. For example, the advertiser specifies a total number of connections between users and a post. As another example, the advertiser specifies a total number of connections or interactions between users and a page associated with the post. If an advertiser specifies a goal, the social networking system compares the efficacy of the object identified by the advertiser to the specified goal after presentation of the object. The efficacy of the identified object may be determined for a specified time interval, determined for a type of user interaction, determined for various types of user interactions, or determined for any other suitable criteria. Information describing the efficacy of the presented object relative to the specified goal may also be presented, allowing the advertiser to evaluate presentation of the object. Hence, the social networking system determines an amount of user interaction with an object identified by an advertiser for presentation to social networking system users and determines whether the amount of user interaction satisfied an amount of user interaction specified by an advertiser. In some embodiments, based on a comparison of a measured amount of user interaction to an amount of user interaction specified by an advertiser, the social networking system may modify the content of an object presented to users (e.g., present a different post associated with the object to users), modify a user demographic group presented with the object, or perform any other suitable interaction to modify the amount of measured user interaction with the object.

An advertiser may specify a budget to limit the amount of compensation the advertiser provides the social networking system to present objects, such as posts, to users. The social networking system may compare an amount of compensation received from the advertiser to the specified budget, and may modify presentation of objects to users based on a difference between the specified budget and the received amount of compensation. For example, fewer objects may be presented to users if the received amount of compensation is within a threshold amount of the specified budget. Alternatively, the social networking system computes an average cost associated with presenting objects to viewing users. For example, the average cost specifies an average amount received by the social networking system to include a sponsored story associated with an object in a viewing user's newsfeed. Based on the average cost and a budget specified by an advertiser, the social networking system determines a number of times an object is promoted to social networking system users to prevent exceeding the specified budget.

Promoting Object Posts Based on User Demographics

Figure 8A:
FIGS. 8a-8b are a flowchart of a method for selecting posts (e.g., posts displayed on a page) for promotion of the page to social networking system users, in accordance with some embodiments.
Figure 8B:
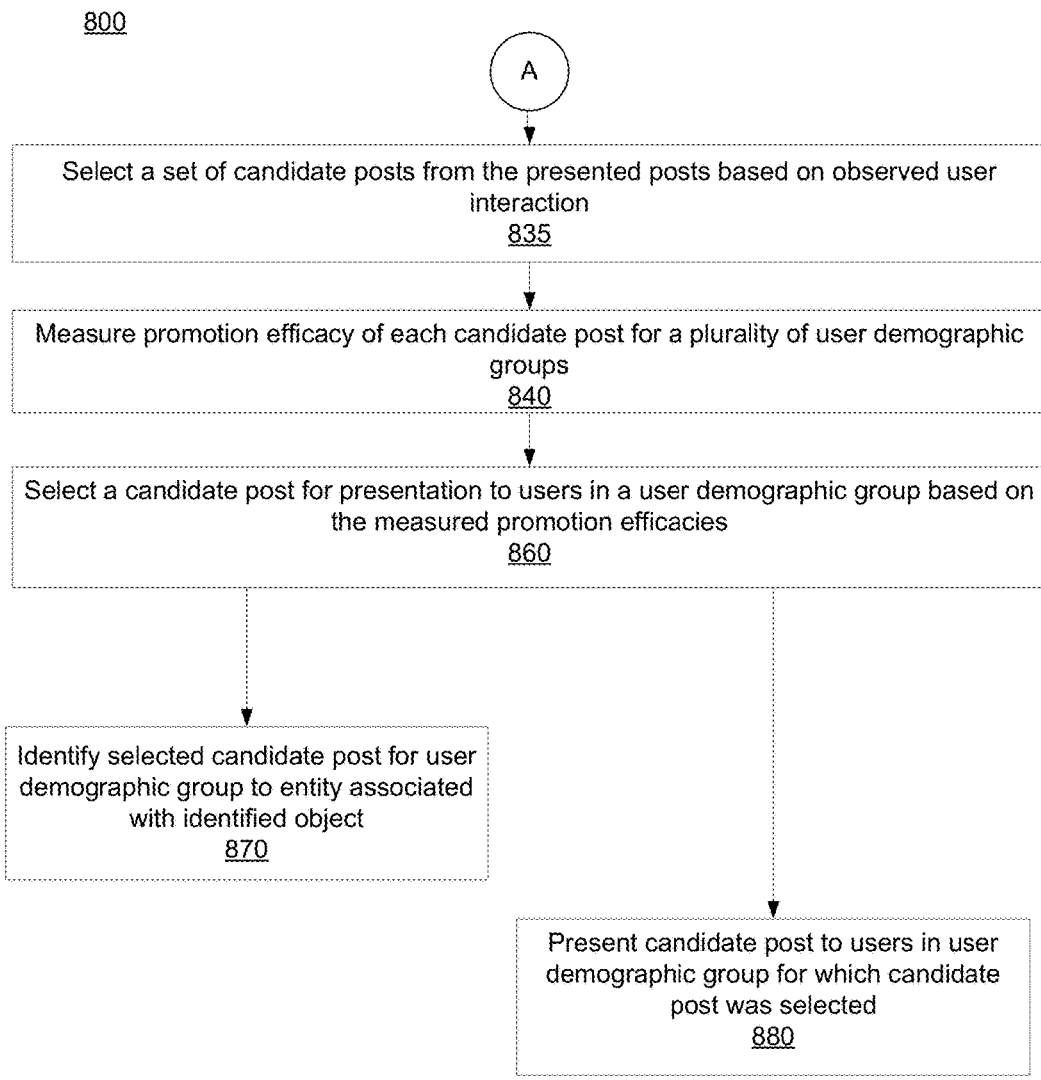

FIGS. 8a-8b are flowchart of one embodiment of a method 800 for selecting posts, or other objects, for presentation to social networking system users. The social networking system receives 810 an indication of an object in the social networking system to be promoted. For example, the social networking system receives 810 an identifier of a page maintained by the social networking system associated with a brand or an entity. The social networking system accesses 815 a user profile associated an entity from which the indication of the object was received 810. For example, the social networking system accesses 815 a user profile associated with an advertiser from which an identifier of a page was received 810. Based on information in the accessed user profile, the social networking system determines 820 whether the entity or user associated with the accessed user profile is authorized to promote the object. For example, a type of connection between the accessed user profile and a user profile of an entity associated with the object determines 820 whether a user or entity associated with the accessed user profile is authorized to promote the object. If information associated with the user profile indicates the entity from which the identifier was received 810 is not authorized to promote the object, the social networking system presents 825 the object to the advertiser without presenting an option to promote the object.

However, if the entity from which the identifier was received 810 is authorized to promote the object, the social networking system observes user interactions with a plurality of posts associated with the object. For example, the social networking system presents 827 various posts associated with the object to a plurality social networking system users. For example, the social networking system presents 827 posts associated with the object in stories presented to users via newsfeeds or presents 827 posts associated with the object in advertisements presented to users. In some embodiments, user interaction with each of the presented posts is observed 830. For example, a number of users accessing a presented post, sharing a presented post with another social networking system user, expressing a preference for a presented post, commenting on a presented post, or performing another suitable interaction with a presented post is determined. In some embodiments, the observed user interaction accounts for users that indirectly interact with a presented post as well as users that directly interact with a presented post.

Based on the observed user interaction with the presented posts, a set of candidate posts are selected 835 from the presented posts. For example, presented posts with at least a threshold amount of user interaction or with highest amounts of user interaction are selected 835 as candidate posts. Alternatively, if the entity from which the identifier was received 810 is authorized to promote the object, the social networking system analyzes previously observed 830 user interaction with posts associated with the object a selects 835 a set of candidate posts associated with at least a threshold amount of user interaction.

A promotion efficacy of each candidate post for each of a plurality of user demographic groups is measured 840. In one embodiment, user profiles associated with users presented with one or more candidate posts are analyzed and demographic characteristics associated with the users are determined from the user profile. One or more user demographic groups each including a plurality of users with at least one common demographic characteristic are determined. In one embodiment, to measure 840 promotion efficacy of a candidate post for a user demographic group, the social networking system presents the candidate post to one or more users in the user demographic group that are not connected to the object via the social networking system or that have not previously interacted with the object via the social networking system. A total number of the users in the user demographic group not connected to the object or not previously interacting with the object that interacted with the object after being presented with the candidate post is determined to measure 840 the promotion efficacy of the candidate post for the user demographic group. In one embodiment, the number of users that did not previously interact with the object and that interacted with the object after being presented with the candidate post within a specified time interval of presentation of the candidate post is determined. The promotion efficacy of the candidate post for a user demographic group may be a ratio of the number of users in the user demographic group that first interacted with the object after being presented with a candidate post to a total number of users in the user demographic group is used to measure 840 the promotion efficacy of the candidate post for the user demographic group.

In alternative embodiments, the social networking system measures 840 promotion efficacy of a candidate post for a user demographic group by predicting a statistical likelihood of users in the user demographic group performing a conversion event after being presented with the candidate post. As described above, examples of conversion events include accessing or interacting with (e.g., liking) the object or page associated with the candidate post, sharing the candidate post with an additional user, expressing a preference for the candidate post, providing a comment associated with the candidate post, or any other suitable action. The statistical likelihood of a user performing a conversion event after being presented with a candidate post is based on characteristics of the user, such as prior conversion events performed by the user when presented with posts having similar characteristics to the candidate post or conversion events performed by users with similar characteristics to the user after being presented with the candidate post. In one embodiment, the promotion efficacy of each candidate post for each user demographic group is measured 840.

Based at least in part on the promotion efficacies of various candidate posts for a user demographic group, a candidate post is selected 860 for presentation to users in the user demographic group. For example, a candidate post having a maximum promotion efficacy for a user demographic group is selected 860 for presentation to users in the user demographic group. In one embodiment, a candidate post is selected 860 for each user demographic group using the promotion efficacies. The selected candidate post is presented to additional users from the user demographic group, such as users from the user demographic group that were not previously presented with the selected candidate post.

In some embodiments, the social networking system identifies 870 a candidate post and a user demographic group for which the candidate post was selected 860 to the entity from which the information identifying the object was received 810. For example, the candidate post is identified 870 to an advertiser associated with the object. This allows the social networking system to identify 870 a candidate post and an audience of users to be presented with a selected candidate post. Information describing one or more demographic characteristics of the user demographic group for which the candidate post was selected 860 may be identified 870 along with information identifying the selected candidate post.

Alternatively, the social networking system presents 880 a selected candidate post to users included in a user demographic group for which the candidate post was selected rather than identify 870 the selected candidate post and demographic characteristics of the user demographic group for which the candidate post was selected 860. For example, based on bid amounts or other information specifying an amount of compensation the social networking system receives from an advertiser for presenting the selected candidate post to users, the social networking system includes the selected candidate post in content presented to one or more users. In one embodiment, a story describing the selected post is included in a newsfeed presented to one or more users by the social networking system. In some embodiments, the story is a description about the selected candidate post that includes one or more options for a user presented with the story to interact with the selected candidate post. An example story describing a candidate post is described above in conjunction with FIG. 4*a*. Alternatively, the social networking system presents 880 the selected one or more candidate posts to one or more users in an advertisement. For example, the advertisement is presented 880 separately from a newsfeed, such as in a region adjacent to the newsfeed and displayed with the newsfeed.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments, which is set forth in the following claims.

What is claimed is:

1. A method comprising:
receiving from a content provider at a social networking system an indication of a page in the social networking system to be promoted;
selecting a set of candidate posts from a plurality of posts associated with the page based on the candidate posts having more than a threshold amount of interaction by users with the candidate posts indicating popularity of the candidate posts;
identifying, by a processor, for each candidate post, demographic characteristics of the users who interacted with the candidate posts;
defining, by a processor, for each candidate post, a plurality of user demographic groups into which the users are grouped based on the demographic characteristics of the users who interacted with the candidate posts, wherein the identified demographic characteristics associated with each user demographic group for the candidate post are demographic characteristics identified as being common to at least a threshold number of users who performed the threshold amount of interaction with the candidate post;
measuring, by the processor, a promotion efficacy of each candidate post for each of the plurality of user demographic groups defined for the candidate post by:
presenting the candidate post to a test set of users in one of the user demographic groups that have not previously interacted with the page in the social networking system; and
computing a measure of user interaction with the candidate posts by users in the test set of users that have not previously interacted with the page in the social networking system;
identifying one or more additional users in each of the plurality of user demographic groups;
selecting a candidate post from the set of candidate posts for presentation to the one or more additional users in each of the user demographic groups based at least in part on the measured promotion efficacy of the candidate posts for the test set of users from a same demographic group; and
providing, for display by the processor, a user interface for each of the one or more additional users, the user interface comprising a newsfeed including the selected candidate post amongst a plurality of stories describing actions performed by other users connected to the additional user.

2. The method of claim 1, wherein measuring promotion efficacy of each candidate post for each of the plurality of user demographic groups comprises:
computing a total number of users in the test set of users in the user demographic group presented with the candidate post;
computing a measure of user interaction based on a number of users in the test set of users that interacted with the page within a specified time interval after being presented with the candidate post; and
determining a measure of promotion efficacy of the candidate post for the user demographic group based at least in part on the total number of users in the test set of users and the measure of user interaction.

3. The method of claim 1, wherein measuring promotion efficacy of each candidate post for each of the plurality of user demographic groups comprises:
determining a statistical likelihood of each user in the user demographic group performing a conversion event after being presented with the candidate post based at least in part on characteristics of each user in the user demographic group.

4. The method of claim 1, wherein the demographic characteristics associated with the user demographic group are selected from a group consisting of: an age distribution, one or more interests, a gender distribution, one or more locations, an ethnicity, one or more languages, or any combination thereof.

5. The method of claim 1, wherein the one or more additional users in each of the user demographic groups comprise users in each of the user demographic groups who have not directly interacted with the page.

6. The method of claim 1, further comprising:
identifying the selected candidate post and each of the user demographic groups to the content provider.

7. The method of claim 6, wherein identifying the selected candidate post and each of the user demographic groups further comprises
identifying one or more demographic characteristics associated with each of the user demographic groups to the content provider.

8. The method of claim 1, further comprising:
presenting the selected candidate post to one or more additional users in each of the user demographic groups.

9. The method of claim 8, further comprising:
receiving a target amount of user interaction with the selected candidate post from the content provider;
measuring an amount of user interaction by the one or more additional users in the user demographic group after being presented with the selected candidate post; and
modifying presentation of the selected candidate post to the one or more additional users in the user demographic group based at least in part on a comparison between the target amount of user interaction and the measured amount of user interaction by the one or more additional users in the user demographic group.

10. The method of claim 1, wherein selecting the candidate post from the set of candidate posts for presentation to the one or more additional users in each of the user demographic groups based at least in part on measured promotion efficacy of the candidate posts for the test set of users from a same demographic group comprises:
selecting a candidate post having a highest measured promotion efficacy for the user demographic group.

11. The method of claim 1, wherein selecting the set of candidate posts from a plurality of posts associated with the page based on the candidate posts having more than a threshold amount of interaction by users with the candidate posts indicating popularity of the candidate posts comprises:
providing the plurality the plurality of posts associated with the page to a plurality of users of the social networking system;
observing one or more user interactions with the plurality of posts by users in the plurality of users; and
selecting the set of candidate posts from the plurality of posts based at least in part on the observed one or more user interactions with the plurality of posts by users in the plurality of users.

12. A computer system comprising:
a processor;
memory coupled to the processor, the memory having encoded thereon instructions that, when executed by the processor, cause the processor to:

receive from a content provider at a social networking system an indication of an page in the social networking system to be promoted;

select a set of candidate posts from a plurality of posts associated with the page based on the candidate posts having more than a threshold amount of interaction by users with the candidate posts indicating popularity of the candidate posts;

identify, by a processor, for each candidate post, demographic characteristics of the users who interacted with the candidate posts;

define, for each candidate post, a plurality of user demographic groups into which the users are grouped based on the demographic characteristics of the users who interacted with the candidate posts, wherein the identified demographic characteristics associated with each user demographic group for the candidate post are demographic characteristics identified as being common to at least a threshold number of users who performed the threshold amount of interaction with the candidate post;

measure a promotion efficacy of each candidate post for each of the plurality of user demographic groups defined for the candidate post by:

present the candidate post to a test set of users in one of the user demographic groups that have not previously interacted with the page in the social networking system; and compute a measure of user interaction with the candidate posts by users in the test set of users that have not previously interacted with the page in the social networking system;

identify one or more additional users in each of the plurality of user demographic groups;

select a candidate post from the set of candidate posts for presentation to the one or more additional users in each of the user demographic groups based at least in part on the measured promotion efficacy the candidate posts for the test set of users from a same demographic group; and provide, for display by the processor, a user interface for each of the one or more additional users, the user interface comprising a newsfeed including the selected candidate post amongst a plurality of stories describing actions performed by other users connected to the additional user.

13. The system of claim 12, wherein measure promotion efficacy of each candidate post for each of the plurality of user demographic groups comprises:

compute a total number of users in the test set of users in the user demographic group presented with the candidate post;

compute a measure of user interaction based on a number of users in the test set of users that interacted with the page within a specified time interval after being presented with the candidate post; and determine a measure of promotion efficacy of the candidate post for the user demographic group based at least in part on the total number of users in the test set of users and the measure of user interaction.

14. The system of claim 12, wherein measure promotion efficacy of each candidate post for each of the plurality of the user demographic groups comprises:

determine a statistical likelihood of each user in the user demographic group performing a conversion event after being presented with the candidate post based at least in part on characteristics of each user in the user demographic group.

15. The system of claim 12, wherein the memory further includes instructions that, when executed by the processor, cause the processor to:

identify the selected candidate post and each of the user demographic groups to the content provider.

16. The system of claim 15, wherein identify the selected candidate post and each of the user demographic groups further comprises:

identify one or more demographic characteristics associated with each of the user demographic groups to the content provider.

17. The system of claim 12, wherein the memory further includes instructions that, when executed by the processor, cause the processor to:

present the selected candidate post to the one or more additional users in each of the user demographic groups.

18. The computer system of claim 12, wherein the instructions that, when executed by the processor, cause the processor to select the set of candidate posts from the plurality of posts associated with the page based on the candidate posts having more than a threshold amount of interaction by users with the candidate posts indicating popularity of the candidate posts comprise instructions, that when executed by the processor, cause the processor to:

provide the plurality the plurality of posts associated with the page to a plurality of users of the social networking system;

observe one or more user interactions with the plurality of posts by users in the plurality of users; and select the set of candidate posts from the plurality of posts based at least in part on the observed one or more user interactions with the plurality of posts by users in the plurality of users.

19. A computer program product comprising a non-transitory computer-readable storage medium including instructions that, when executed by a processor, cause the processor to:

receive from a content provider at a social networking system an indication of an page in the social networking system to be promoted;

select a set of candidate posts from a plurality of posts associated with the page based on the candidate posts having more than a threshold amount of interaction by users with the candidate posts indicating popularity of the candidate posts;

identify, by a processor, for each candidate post, demographic characteristics of the users who interacted with the candidate posts;

define, by a processor, for each candidate post, a plurality of user demographic groups into which the users are grouped based on the demographic characteristics of the users who interacted with the candidate posts, wherein the identified demographic characteristics associated with each user demographic group for the candidate post are demographic characteristics identified as being common to at least a threshold number of users who performed the threshold amount of interaction with the candidate post;

measure a promotion efficacy of each candidate post for each of the plurality of user demographic groups defined for the candidate post by:

present the candidate post to a test set of users in one of the user demographic groups that have not previously interacted with the page in the social networking system; and compute a measure of user interaction with the candidate posts by users in the test set of users that have not previously interacted with the page in the social networking system;

identify one or more additional users in each of the plurality of user demographic groups;

select a candidate post from the set of candidate posts for presentation to the one or more additional users in each of the user demographic groups based at least in part on the measured promotion efficacy of the candidate posts for the test set of users from a same demographic group; and provide, for display by the processor, a user interface for each of the one or more additional users, the user interface comprising a newsfeed including the selected candidate post amongst a plurality of stories describing actions performed by other users connected to the additional user.

20. The computer program product of claim 19, wherein measure promotion efficacy of each candidate post for each of the plurality of user demographic groups comprises:

compute a total number of users in the test set of users in the user demographic group presented with the candidate post;

compute a measure of user interaction based on a number of users in the test set of users that interacted with the page within a specified time interval after being presented with the candidate post; and determine a measure of promotion efficacy of the candidate post for the user demographic group based at least in part on the total number of users in the test set of users and the measure of user interaction.

21. The method of claim 11, wherein defining the user demographic groups for each candidate post further comprises:

identifying one or more keywords associated with the page to be promoted; and identifying user demographic groups including users who performed one or more of the observed user interactions with the candidate post and whose user profiles include keywords matching at least one of the identified keywords associated with the page.

22. The method of claim 1, wherein measuring a promotion efficacy of each candidate post for each user demographic group further comprises:

predicting a statistical likelihood of users within the user demographic group performing at least one of following types of conversion events if presented with the candidate post: accessing the candidate post, expressing preference for the candidate post, sharing the candidate post with another user, and commenting on the candidate post.

23. The method of claim 1, wherein the promotion efficacy for each demographic group is further measured based on whether the candidate post was presented to users of the demographic group as organic content, viral content, or paid content.

24. The method of claim 1, further comprising:

receiving, from the content provider, a goal for target user engagement with the page to be promoted;

comparing the measured promotion efficacy against the specified goal of the content provider; and modifying presentation of one or more of the candidate posts to the one or more additional users based on a result of the comparing.

25. The method of claim 11, wherein the observed one or more user interactions are based on users who have directly interacted with the page.

* * * * *

UNITED STATES PATENT AND TRADEMARK OFFICE
CERTIFICATE OF CORRECTION

PATENT NO. : 10,373,270 B2  
APPLICATION NO. : 14/053567  
DATED : August 6, 2019  
INVENTOR(S) : Dong Guo et al.

Page 1 of 1

It is certified that error appears in the above-identified patent and that said Letters Patent is hereby corrected as shown below:

In the Claims

In Column 18, Claim 11, Line 54, delete "the plurality the plurality" and insert -- the plurality --.

In Column 19, Claim 12, Line 2, delete "an page" and insert -- a page --.

In Column 20, Claim 18, Line 30, delete "the plurality the plurality" and insert -- the plurality --.

In Column 20, Claim 19, Line 45, delete "an page" and insert -- a page --.

Signed and Sealed this  
Seventh Day of April, 2020

Andrei Iancu  
*Director of the United States Patent and Trademark Office*